US007214879B1

(12) United States Patent
Suzuki et al.

(10) Patent No.: US 7,214,879 B1
(45) Date of Patent: May 8, 2007

(54) PROTECTOR

(75) Inventors: Takashi Suzuki, Mie (JP); Seiichi Kawasaki, Kanagawa (JP)

(73) Assignees: Sumitomo Wiring Systems, Ltd., Mie (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 11/213,965

(22) Filed: Aug. 30, 2005

(30) Foreign Application Priority Data

Aug. 31, 2004 (JP) ........................... P2004-251664

(51) Int. Cl.
*H02G 3/04* (2006.01)

(52) U.S. Cl. .................................... 174/72 A; 174/68.3

(58) Field of Classification Search .............. 174/72 A, 174/68.3, 135, 72 R, 69
See application file for complete search history.

(56) References Cited

U.S. PATENT DOCUMENTS 4,951,716 A 8/1990 Tsunoda et al.
5,016,842 A 5/1991 Suzuki et al.
5,401,905 A 3/1995 Lesser et al.
5,597,980 A * 1/1997 Weber ...................... 174/72 A
5,779,952 A 7/1998 Matsumoto et al.

FOREIGN PATENT DOCUMENTS

JP A 06-086426 3/1994

* cited by examiner

*Primary Examiner*—Jinhee Lee
(74) *Attorney, Agent, or Firm*—Oliff & Berridge, PLC

(57) ABSTRACT

A protector body is projected with lock-claw engaging frames with a spacing lengthwise, on widthwise front and rear both sidewalls. The lid is downwardly projected with lock pieces having lock claws, to be engaged with the lock-claw engaging frames, with a spacing lengthwise at both front and rear widthwise ends thereof. The lid is also projected with a vehicle-fixing bracket at any one of front and rear widthwise ends thereof. The lock-claw engaging frames of the protector body and the lock pieces of the lid, while arranged with the equal spacing on the same side with respect to a front and rear direction, are mutually different in spacing in the front and rear direction to thereby prohibit the lid. When assembled to the protector body incorrectly in a widthwise direction, lock-joining is prohibited. Thus, the vehicle-body-fixing bracket of the lid is structurally arranged in the regular direction.

3 Claims, 5 Drawing Sheets

PROTECTOR

BACKGROUND OF THE INVENTION

1. Field of the Invention

The present invention relates to a protector for armoring a wire harness to be laid on the automobile.

2. Description of the Related Art

It is a practice to pass a wire harness, to be laid on the automobile, through a resin-molded protector in a required wire-laying area in order to achieve route regulation and enhanced protection of significant wires. The protector has a protector body in a trough form that is lock-joined with a lid for closing an upper opening of the protector body after passing an electric-wire group of wire harness through the protector body (see JP-A-6-86426).

The lid, in many cases, is integrally formed with the protector body through a thin-walled hinge at an upper end of one sidewall of the protector body. However, where the protector body is bent, the lid must be formed split. Because of the reasons of complicated formation, it is often a case to form a protector body 1 and a lid 2 separately so that a wire harness can be passed through the protector body 1 and then covered with the lid 2 thereby making a lock joining, as shown in FIG. 6. Meanwhile, the lid 2, a separate member, frequently is projected with a vehicle-fixing bracket 3 opened with a bolt hole 3*a* for fixing the protector on a fixed member, such as a vehicle body panel.

Lock parts are provided on the protector body 1 and lid 2 made separate as in the above. Lock-claw engaging frames 1*c* project with a required spacing along outer-surface upper ends of both sidewalls 1*a*, 1*b* of the protector body 1 while lock pieces 2*b*, having lock claws 2*a* projecting down, project at widthwise both ends S1, S2 of the lid 2.

In this case, the lock-claw engaging frames 1*c* are provided at an equal pitch P in a lengthwise direction. Those are provided naturally at the equal pitch P lengthwise to the lock pieces 2*b* to be lock-joined with the lock-claw engaging frames 1*c*. Moreover, the lock-claw engaging frames 1*c* of the protector body 1 and the lock pieces 2*b* of the lid 2 are provided in opposite positioned to each other with respect to a widthwise direction X.

Accordingly, even in case the lid 2 is covered incorrectly widthwise onto the protector body 1 as shown in FIG. 7, the lock claws 2*a* of lid 2 can be lock-joined with the lock-claw engaging frames 1*c* of protector body 1. However, when the lid 2 inverse widthwise, the vehicle-engaging bracket 3 in an incorrect mount position shown in FIG. 7 is directed upward X2 relative to the positioning of the vehicle-engaging bracket 3 directed downward X1 in the regular mount position shown in FIG. 7.

Accordingly, when fixing the protector onto a vehicle body, the bolt hole in the vehicle-engaging bracket 3 does not position on a vehicle panel side, posing a problem that the protector is not to be fixed on the vehicle panel.

SUMMARY OF THE INVENTION

It is an object thereof that, where there is a lid to be covered on and lock-joined with the protector body so that the lid can be projected with a vehicle fixing bracket, the lid is prevented from being attached incorrectly inverse widthwise on the protector body whereby the vehicle fixing bracket provided on the lid is provided projecting in a protector regular position this avoiding a situation not to be fixed onto a fixing member, such as a vehicle body panel.

According to one aspect of the invention, there is provided a protector being outwardly attached to a wire harness disposed on a vehicle, the protector including: a protector body having a substantial trough shape, the protector body having both side walls being opposed to with each other so as to sandwich the wire harness therebetween; and a lock-claw engaging frame being projected from the protector body, the lock-claw engaging frame being provided on both side walls of the protector body which are along a width direction of the protector, the lock-claw engaging frame being provided at a first predetermined distance along a length direction of the protector body; and a lid attachable on the protector body after the wire harness has passed through the protector body, the lid having: a lock piece being downwardly projected from the lid, the lock piece having a lock-claw engageable with the lock-claw engaging frame, the lock piece of the lid being provided on both ends of the lid along a width direction of the lid, the lock piece of the lid being provided at a different predetermined distance from the first predetermined distance along a length direction of the lid, the lid having a vehicle fixing bracket projected from either one end of both ends of the lid along the width direction of the lid. The lid is not locked to the protector body by the lock piece of the lid and the lock-claw engaging frame of the protector body, when the lid is incorrectly assembled to the protector body in the width direction of the lid. The vehicle-fixing bracket is arranged in a regular direction.

According to the above-structure, in case that the lock pieces and lock-claw engaging frames on widthwise both sides of the lid and protector body are mutually deviated in spacing, the lock pieces of the lid and the lock-claw engaging frames are not matched in respective position even when the lid is covered incorrectly widthwise onto the protector body. Thus, the lid is prevented from being locked with the protector body. Accordingly, the operator allows to aware the lid is attached in an incorrect direction to rearrange the lid into a correct regular position. The lid can be locked to the protector body.

Incidentally, in case the lid lock piece and the protector-body lock-claw engaging frame are in positions of point symmetry about a lengthwise center when those are incorrect widthwise, the lid lock piece and the protector-body lock-claw engaging frame are matched in position even when reverse widthwise. Accordingly, in order to provide a setting not for locking when the lid is put incorrectly widthwise, arrangement is not in point symmetry with the left and right lock piece and lock-claw-engaging frame.

According to another aspect of the invention, a lock-claw engaging frame of the protector body is provided at a front-rear opposite positions around a vicinity of both ends of the protector body in the length direction of the protector body. A lock piece of the lid is provided at a front rear opposite portions around a vicinity of both ends of the lid. The lock-claw engaging frame of the protector body is arranged to be displaced in the length direction of the protector body in an intermediate portion of the protector body. The lock piece of the lid is arranged to be displaced in the length direction of the lid in an intermediate portion of the lid.

By thus-configuration, on the protector, in case the lid is locked with the protector body particularly at lengthwise both ends and their around, the lid is not easily detached from the protector body by an external interfering member. At the lengthwise both ends, lock pieces and lock-claw engaging frames are arranged in opposite positions with respect to a front-rear widthwise direction. Accordingly, the left-and-right-pitch change point is taken at a lengthwise intermediate position.

According to another aspect of the invention, when the lid is incorrectly assemble to the protector body to be inverted in the width direction of the lid, the lock-claw is positioned to be interfered with a frame portion of the lock-claw engaging frame of the protector body.

By thus configuration, when the lock piece interferes with the lock-claw engager, the lid lock piece abuts against the protector-body lock-claw engaging frame into a state the opening is not closed tightly. Hence, the operator is allowed to aware that the lid is in an incorrect direction.

According to the above-aspects of the invention, in case the lid is put incorrect widthwise when attaching the separately-provided lid to the protector body in a manner closing the opening thereof, lock-joining is not effected because of mismatch in position between the lid and the protector body. The operator is allowed to be aware that the lid is in an incorrect direction, and to lock-join the lid and the protector body together after changing the lid into the regular direction.

Accordingly, the vehicle-fixing bracket projecting from the lid can be provided projecting to the regular position, thus preventing against being aware of incorrect lid direction for the first time upon fixing to a vehicle body panel, etc.

DESCRIPTION OF THE PREFERRED EMBODIMENTS

With reference to the drawings, an embodiment of the present invention will now be explained.

Figure 1:
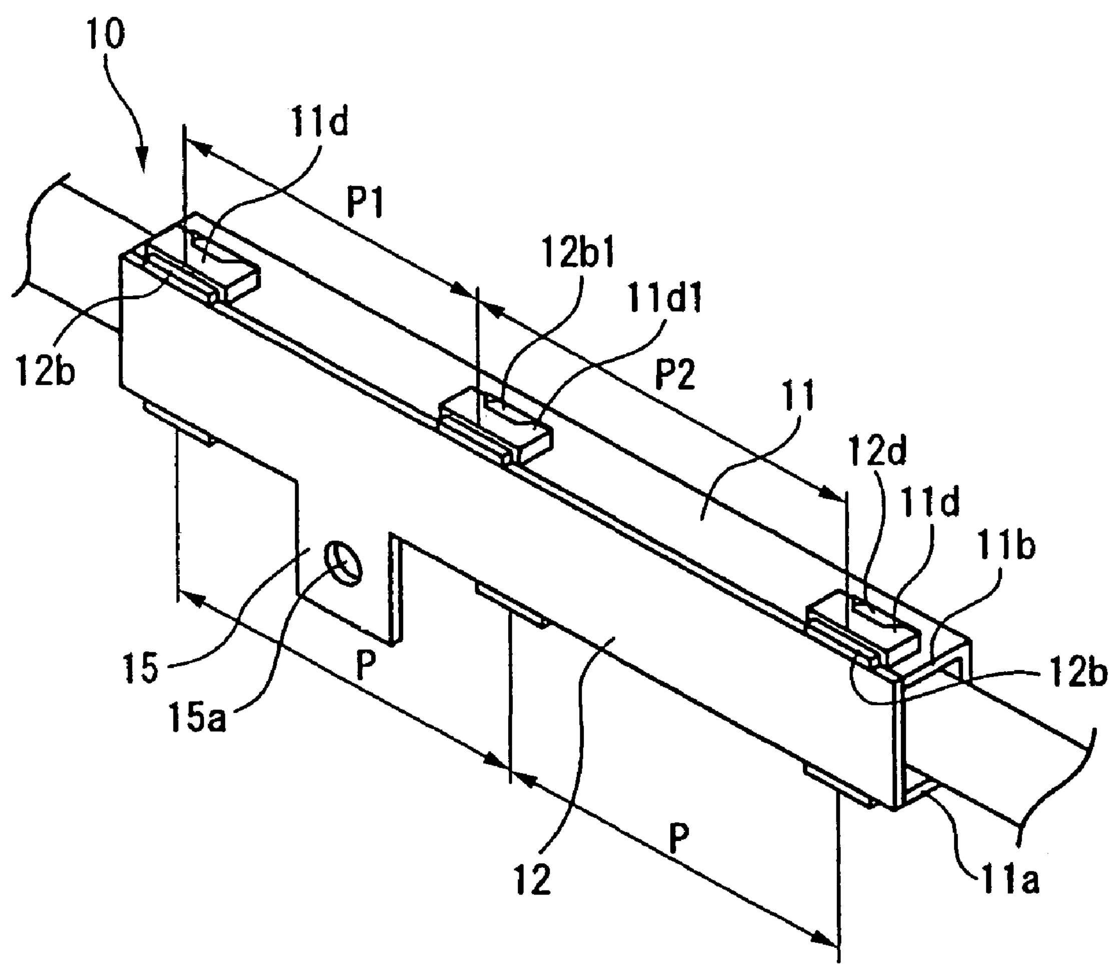
FIG. 1 is a perspective view of a protector in a first embodiment of the present invention.

FIGS. 1 to 4 show a protector 10 in a first embodiment. The protector 10 is made up by a protector body 11 in a trough form formed of a resin-molded product, and a lid 12 closing an opening of the protector body 11. In this embodiment, the opening in the protector body 11 is directed laterally so that the lid 12 can be arranged vertical at one side in a manner closing the opening and lock-joined to the protector body 11, as shown in FIG. 1.

Figure 2:
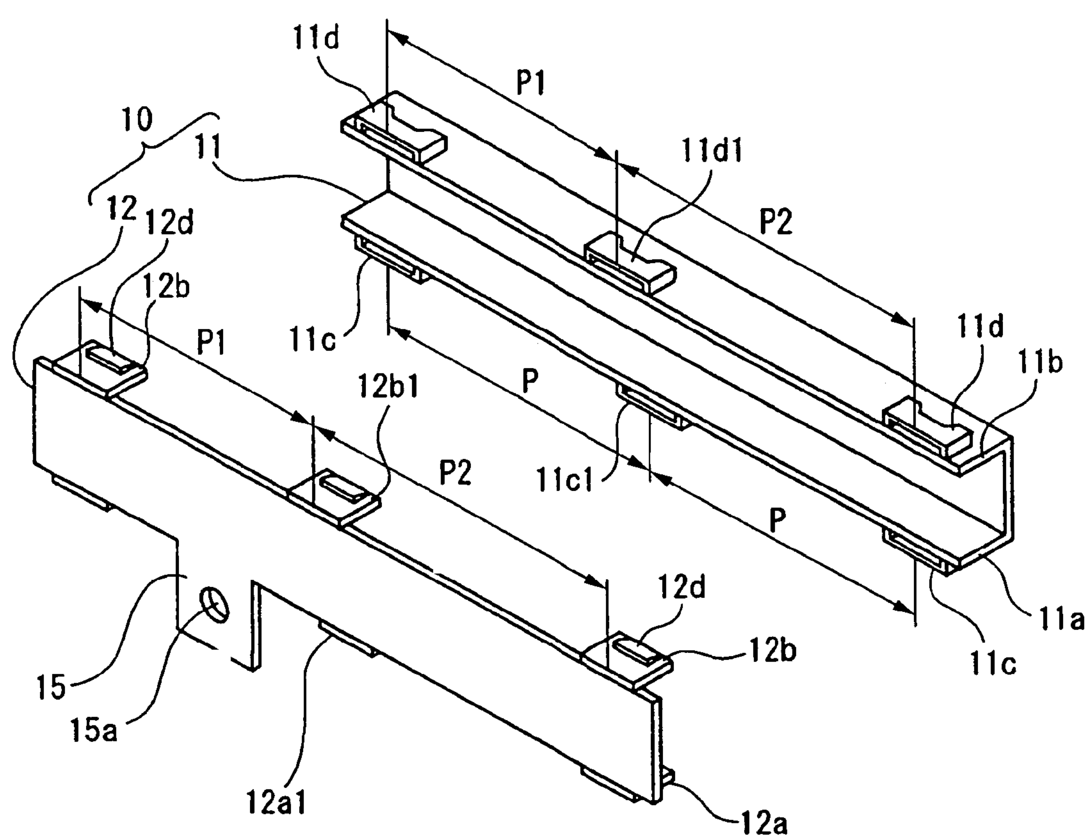
FIG. 2 is an exploded perspective view of a protector body and lid of the protector according to the first embodiment.
Figure 3:
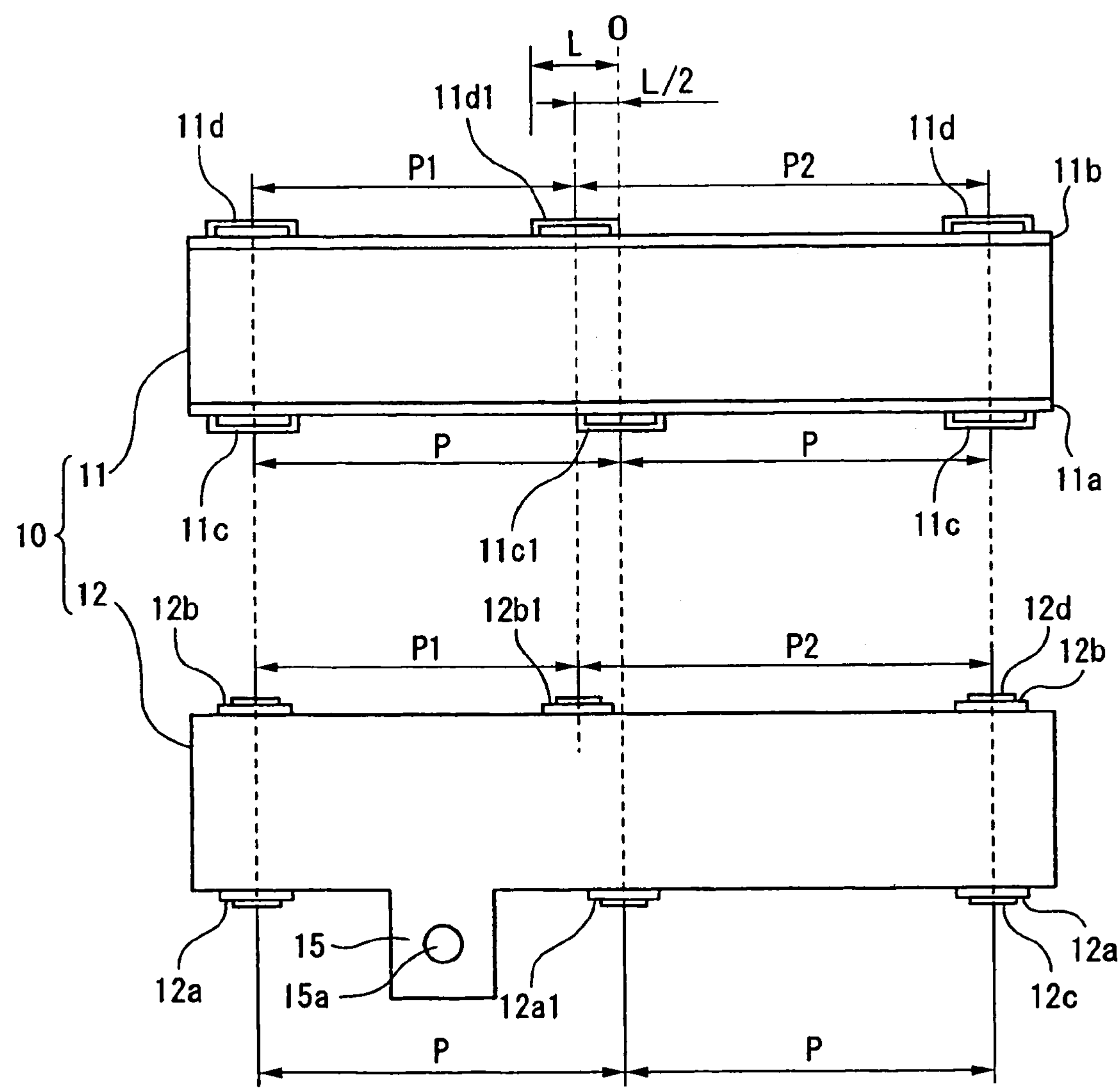
FIG. 3 shows a positional relationship between the lock-claw engaging frames of protector main body of the protector and the lock pieces of the lid according to the first embodiment.
Figure 4:
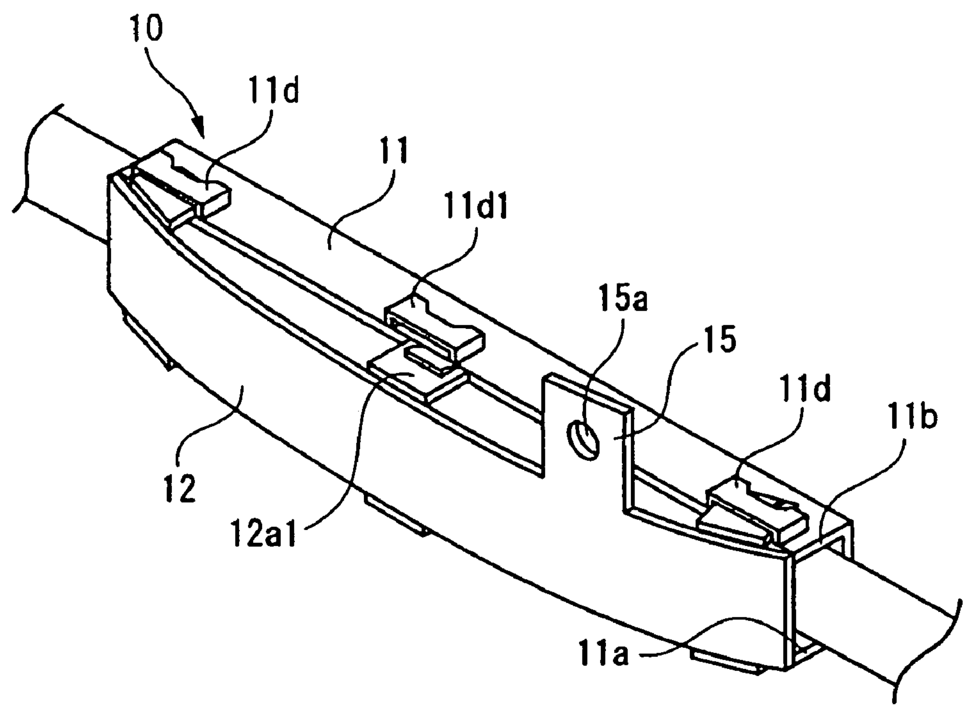
FIG. 4 is a perspective view showing the case that the lid is incorrect in direction according to the first embodiment.

As shown in FIGS. 2 and 3, lock-claw engaging frames 11*c*, 11*d* are respectively provided on front side wall 11*a* and back side wall 11*b* which are opposite to with each other in a width direction of the protector body 11. The frames 11*c*, 11*d* are projected from and along upper ends of both sidewall surfaces with a predetermined distance in a length direction of the frames.

Incidentally, in the first embodiment shown in FIG. 1, the lock-claw engaging frames 11*c*, lid are provided three in the lengthwise direction. Three or more may be provided with the side walls. The front wall 11*a* and the rear wall 11*b* are respectively arranged with the lock-claw engaging frames 11*c*, 11*d* at both ends of length direction of the protector body 11. The lock-claw engaging frame 11*c* and 11*d* are opposite in a front-and-rear widthwise direction of the protector body 11. However, the lock-claw engaging frames 11*c*1, 11*d*1 positioned at intermediate position of the length direction of the protector body 11 are not opposed in the front-and-rear widthwise direction of the protector body 11, but are arranged to be displaced in the length direction of the protector body 11.

As for the front lock-claw engaging frame 11*c*1, with reference to FIG. 3, the front lock-claw engaging frame 11*c*1 has a length "L". A center position of the front lock-claw engaging frame 11*c*1 in a direction thereof coincides with a center position "O" with respect to a lengthwise of the protector body 11. Accordingly, in FIG. 3, a distance defined as "P" between a font lock-claw engaging frame 11*c* on a left side and the lock-claw engaging frame 11*c*1 is equal to a distance between the center lock-claw engaging frame 11*c*1 and the lock-claw engaging frame 11*c* on a right side.

As for the rear lock-claw engaging frame 11*d*1, with reference to FIG. 3, the rear lock-claw engaging frame 11*d*1 is provided deviated ½L leftward with respect to the center point O. Accordingly, there is a difference of ½L between a distance P1 between the lock-claw engaging frame 11*d* on the left side and the center lock-claw engaging frame 11*d*1 and a distance P2 between the lock-claw engaging frame 11*d* on right side and the center lock-claw engaging frame 11*d*1.

The lid 12 has a plate shape to close an upper opening of the protector body 11. lock pieces 12*a*, 12*b* are downwardly projected from both end of the lid 12. the lock pieces are provided at front-and-rear both ends of the lid in a width direction of the lid with a predetermined distance in a length direction of the lid. The lock pieces 12*a*, 12*b* are respectively projected with lock claws 12*c*, 12*d* at lower ends thereof.

The lock pieces 12*a*, 12*b* at the front-and-rear both ends are arranged to be opposite with each other, and are also positioned to be opposed to the lock-claw engaging frames 11*c*, lid at the front-and-rear both ends of the protector body 11.

The lock pieces 12*a*1 and 12*b*1 positioned at intermediate positions in the direction of the lid are not opposed in a front-rear direction of the lid, but deviated in lengthwise positions. The front lock piece 12*a*1 is arranged in an opposite position to the front lock-claw engaging frame 11*c*1 while the rear lock piece 12*b*1 is arranged in an opposite position to the rear lock-claw engaging frame 11*d*1. Accordingly, the front lock piece 12*a*1 is matched with the lengthwise center O while the rear lock piece 12*b*1 is deviated ½L leftward. The distances to the left and right are differently given P1 and P2 similarly to the lock-claw engaging frames of the protector body.

Meanwhile, the lid 12 is projected with a plate-formed bracket 15 for fixing to the vehicle, between the front lock piece 12*a* at lengthwise one end and the intermediate lock piece 12*a*1. The vehicle-fixing bracket 15 is opened with a bolt hole 15*a*. The vehicle-fixing bracket 15, when mounted onto a vehicle body into an arrangement shown in FIG. 1, is placed projecting downward out of the lower end of the lid 12.

With the above structure of protector 10, in case taking, as a regular direction, the front-rear widthwise of the lid 12 to be attached to the protector body 11, the front lock piece 12*a*1 at the intermediate position of the lid 12 and the lock-claw engaging frame 11*c*1 of the protector body 11 are in coincident opposite positions while the rear lock piece 12*b*1 and the lock-claw engaging frame 11*d*1 are in coincident opposite positions. Because the lid lock pieces at lengthwise both ends and the lock-claw engaging frames of protector main body 11 are also in opposite positions, the lid 12 can be lock-joined to the protector body 11. In this state, the vehicle-fixing bracket 15 projects in the regular direction from the lid 12.

Meanwhile, in the case to assemble the lid 12 reverse in its front-rear width onto the protector body 11, the lock piece 12*a*1 of lid 12 at its lengthwise one end becomes a state interfering with and getting onto a frame end of the lock-claw engaging frame 11*d*1 of protector body 11. Likewise, the lock piece 12*b*1 also becomes a state interfering with and getting onto the lock-claw engaging frame 11*c*1. Accordingly, the lid 12 at its center warps outward thus making it impossible to provide a close arrangement onto the opening of the protector body 11. This allows the operator to be aware that the lid is in an incorrect direction.

Figure 5:
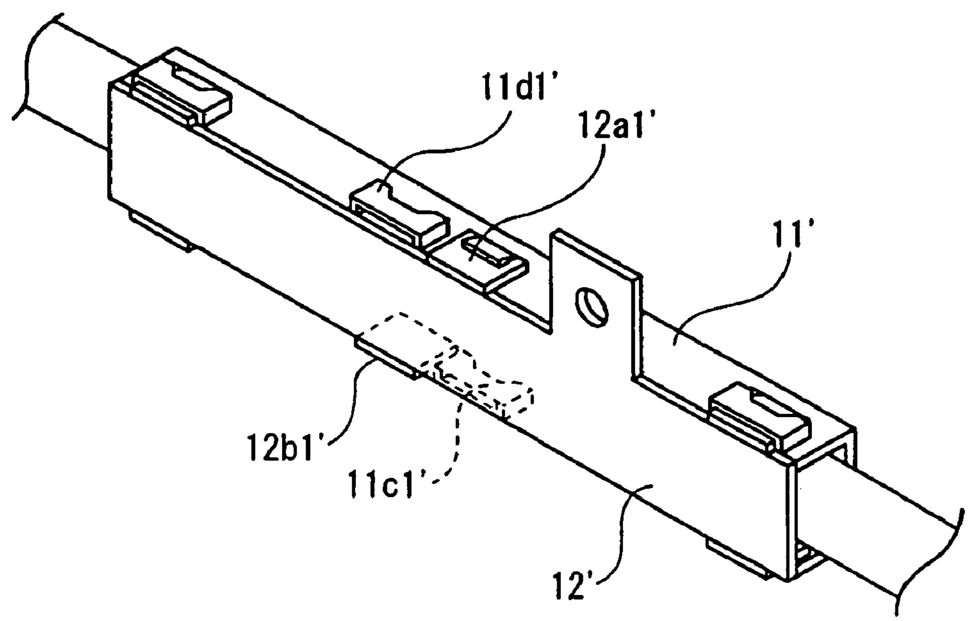
FIG. 5 shows a modification of the first embodiment.
Figure 6:
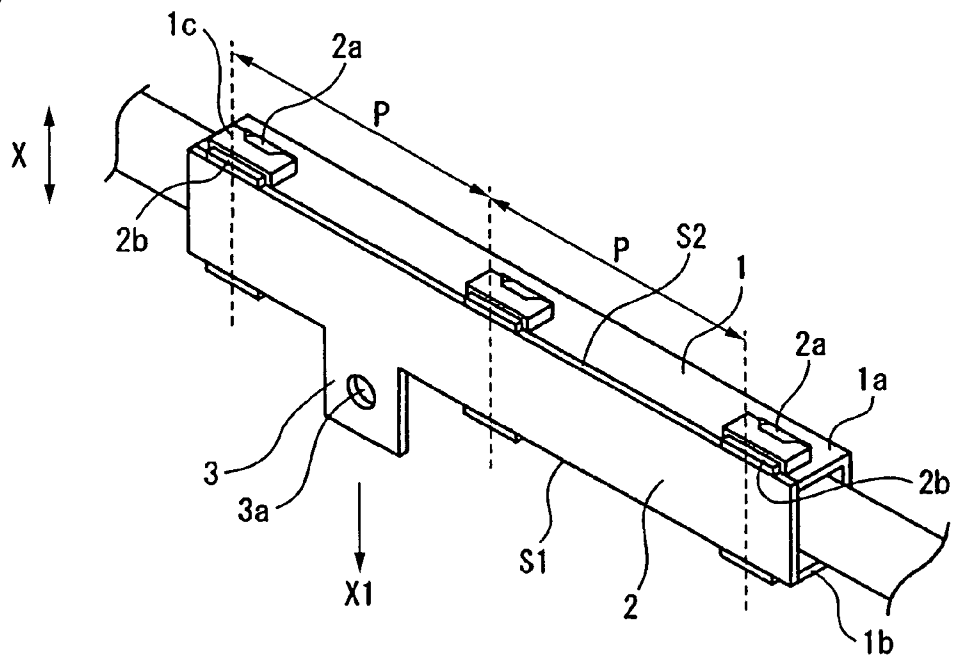
FIG. 6 is a perspective view showing a related art.
Figure 7:
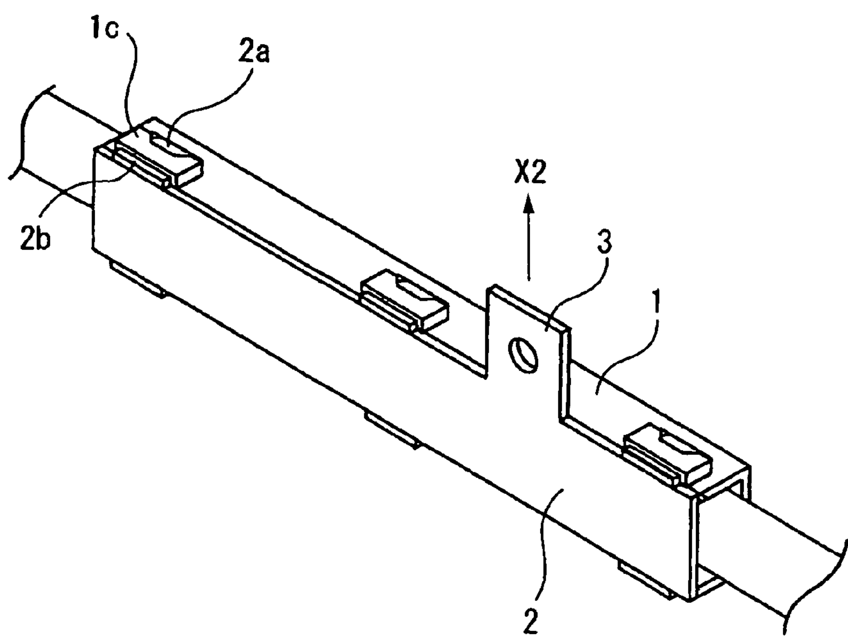
FIG. 7 is a perspective view showing a problem in the related art.

FIG. 5 shows a modification. When the lock piece 12*a*1', 12*b*1' at intermediate position and the lock-claw engaging frame at intermediate position of the protector body 11' are assembled in incorrect direction of lid 12' onto the protector body 11', in the case there is no mutual interference between the lock piece 12*a*1' and the lock-claw engaging frame 11*d*1' and also between 12*b*1' and 11*c*1', the lock-claw engaging frames of the protector body 11' are not in positions of the lock pieces 12*a*1', 12*b*1', thus not allowing for lock joining. Accordingly, the operator is allowed to be aware of incorrect direction.

What is claimed is:

1. A protector outwardly attached to a wire harness disposed on a vehicle, the protector comprising:

a protector body having a substantial trough shape, the protector body having side walls opposed to each other so as to sandwich the wire harness therebetween, and a lock-claw engaging frame projected from the protected body, the lock-claw engaging frame being provided on both side walls of the protector body which are along a width direction of the protector, the lock-claw engaging frame being provided at a first predetermined distance along a length direction of the protector body; and a lid attachable on the protector body after the wire harness has passed through the protector body, the lid having: a lock piece downwardly projected from the lid, the lock piece having a lock claw engageable with the lock-claw engaging frame, the lock piece of the lid being provided on both ends of the lid along a width direction of the lid, the lock piece of the lid being provided at a different predetermined distance from the first predetermined distance along a length direction of the lid, the lid having a vehicle-fixing bracket projected from either one end of both ends of the lid along the width direction of the lid, wherein the lid is not locked to the protector body by the lock piece of the lid and the lock-claw engaging frame of the protector body, when the lid is incorrectly assembled to the protector body in the width direction of the lid, and wherein the vehicle-fixing bracket is arranged in a regular direction.

2. A protector according to claim 1, wherein a lock-claw engaging frame of the protector body is provided at a front-rear opposite positions around a vicinity of both ends of the protector body in the length direction of the protector body, wherein a lock piece of the lid is provided at a front rear opposite portions around a vicinity of both ends of the lid, wherein the lock-claw engaging frame of the protector body is arranged to be displaced in the length direction of the protector body in an intermediate portion of the protector body, and wherein the lock piece of the lid is arranged to be displaced in the length direction of the lid in an intermediate portion of the lid.

3. A protector according to claim 1, wherein when the lid is incorrectly assembled to the protector body to be inverted in the width direction of the lid, the lock claw is positioned to be interfered with a frame portion of the lock-claw engaging frame of the protector body.

* * * * *